J. M. LIVESAY.
AUTO SPRING.
APPLICATION FILED AUG. 25, 1914.
1,131,530.
Patented Mar. 9, 1915.
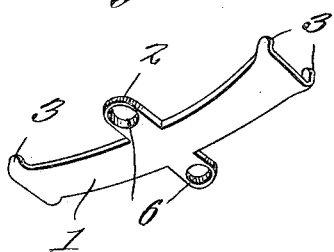
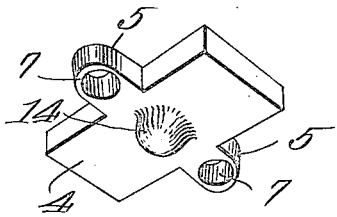
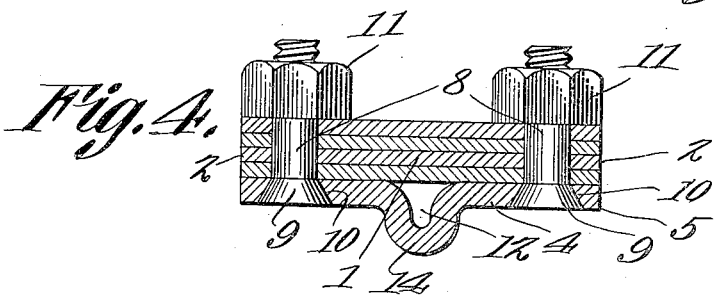
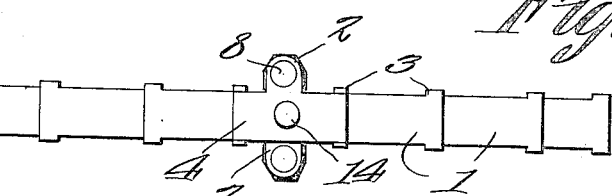
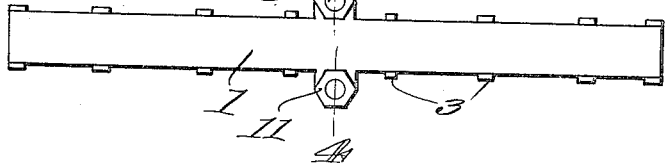
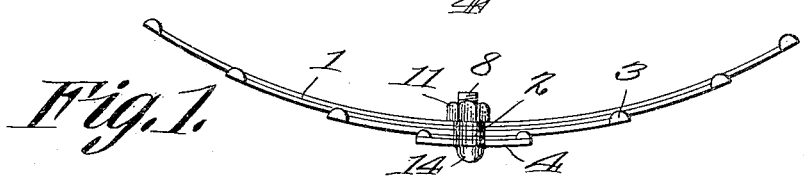
Witnesses
F. B. Wooden.
M. E. McCarthy.
John M. Livesay, Inventor
by
C. A. Snow & Co.
Attorneys.

UNITED STATES PATENT OFFICE.

JOHN M. LIVESAY, OF RONCEVERTE, WEST VIRGINIA.

AUTO-SPRING.

1,131,530.  Specification of Letters Patent.  Patented Mar. 9, 1915.

Application filed August 25, 1914. Serial No. 858,537.

*To all whom it may concern:*

Be it known that I, JOHN M. LIVESAY, a citizen of the United States, residing at Ronceverte, in the county of Greenbrier and State of West Virginia, have invented a new and useful Auto-Spring, of which the following is a specification.

The device forming the subject matter of this application is a vehicle spring and one object of the invention is to provide a device of this type comprising a plurality of leaves which are not pierced along their longitudinal centers and intermediate their ends, to receive the securing elements whereby the several constituent leaves of the spring are held together, it being well known that it is at the point of perforation that springs of this type most commonly break.

The invention aims specifically to improve the base plate upon which the leaves of the spring rest and to reinforce and strengthen this base plate in a novel manner.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing: Figure 1 shows in side elevation a spring embodying the present invention; Fig. 2 is a top plan of the structure shown in Fig. 1; Fig. 3 is a bottom plan of the structure shown in Fig. 1; Fig. 4 is a cross section on the line 4—4 of Fig. 2; Fig. 5 is a perspective showing one of the leaves of the spring; Fig. 6 is a perspective view delineating the base plate.

The spring herein disclosed comprises a plurality of leaves denoted by the numeral 1, the leaves being of different lengths as is common in the art. One of the leaves 1 is shown in Fig. 5. Each leaf is provided intermediate its ends and upon its opposite edges with outstanding ears 2 projecting in opposite directions. Adjacent its ends each leaf of the spring is equipped with fingers 3 adapted to engage the edges of the next adjacent leaf. The lowermost leaf of the series is superposed upon a base plate 4. The plate 4 is provided intermediate its ends and upon its opposite edges with outstanding ears 5. The ears 5 on the base plate 4 are alined vertically with the ears 2 of the leaves 1 of the spring, the ears of the base plate 4 and of the leaves 1 being provided with openings, the openings in the ears of the leaves being shown at 6 and the openings in the ears 5 of the base plate being denoted by the reference character 7.

Through the openings in the ears of the leaves of the spring and the base plate are passed securing elements 8 which may be bolts. The bolts 8 terminate in tapered ends 9, and in this connection it is to be noted that the openings 7 in the ears 5 of the base plate are countersunk as shown at 10 to receive the tapered heads 9 of the bolt. In order that this countersinking of the openings 8 may be carried out without materially weakening the structure, the base plate 4 is made thicker than any leaf of the spring. Threaded onto the extremities of the bolts 8 are nuts 11 which bear upon the ears 2 of the uppermost leaf of the spring.

It is to be observed that by the construction above outlined, the leaves of the spring are not pierced along their longitudinal centers, and, consequently, the spring is not likely to break at the point above indicated.

As another and specific improvement to the structure herein disclosed, the constituent material of the base plate 4 is distorted and punched downwardly, as shown at 12 to form a boss or lug 14. This lug 14 is adapted to enter an opening in the structure wherewith the spring is assembled, the function of the lug being to hold the spring against movement. The lug 14 has another function, in that it reinforces the base plate intermediate the ears 5 and it is to be observed that this result is brought about not by adding metal to the base plate but merely by distorting the constituent metal of the base plate so that, without additional expense and without adding metal to the spring, a reinforcement is effected and a locking lug is provided. The base plate 4, without the addition of material, as hereinbefore stated, is reinforced and, at the same time, a means is provided for holding both the base plate and the superposed leaves of the spring in place against movement on the structure wherewith the spring is assembled.

Having thus described the invention, what is claimed is:—

A spring comprising a plurality of leaves and a base plate upon which the outer leaf rests, all of the leaves and the base plate being provided intermediate their ends and upon their edges with outstanding ears having openings, the openings in the ears of the base plate being countersunk and the base plate being thicker than any leaf, thereby to offset the weakening of the ears of the base plate caused by the countersinking thereof; bolts passing through the openings in the ears of the base plate and in the ears of the leaves, the bolts being provided with enlarged heads received in the countersunk openings of the ears of the base plate; and nuts threaded onto the bolts, the nuts bearing against the ears of the inner leaf; a portion of the constituent material of the base plate being struck downwardly, intermediate the securing devices and in alinement therewith, to form, at once, a hollow reinforcement for the base plate and a locking lug for holding the spring in place, the wall of the combined reinforcement and lug being of the same thickness as the base plate.

In testimony that I claim the foregoing as my own, I have hereto affixed my signature in the presence of two witnesses.

JOHN M. LIVESAY.

Witnesses:
 FRED McK. BETH,
 C. E. CRICKMER.

Copies of this patent may be obtained for five cents each, by addressing the "Commissioner of Patents, Washington, D. C."